United States Patent
Parnell et al.

(10) Patent No.: US 9,344,756 B2
(45) Date of Patent: *May 17, 2016

(54) SYSTEM AND METHOD FOR TRANSMITTING FILES FROM A SENDER TO A RECEIVER IN A TELEVISION DISTRIBUTION NETWORK

(75) Inventors: James Parnell, Westampton, NJ (US); Matthew Schrier, Holland, PA (US); John Denison, Bensalem, PA (US); John Wurtz, Bryn Mawy, PA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/564,322

(22) Filed: Sep. 22, 2009

(65) Prior Publication Data

US 2010/0011403 A1 Jan. 14, 2010

Related U.S. Application Data

(63) Continuation of application No. 10/805,728, filed on Mar. 22, 2004, now Pat. No. 7,594,254.

(51) Int. Cl.
*H04N 7/16* (2011.01)
*H04N 21/434* (2011.01)
(Continued)

(52) U.S. Cl.
CPC ............ *H04N 21/434* (2013.01); *H04N 7/162* (2013.01); *H04N 21/2362* (2013.01); *H04N 21/26266* (2013.01)

(58) Field of Classification Search
CPC .......... H04N 21/236; H04N 21/23605; H04N 21/23611; H04N 21/4344
See application file for complete search history.

(56) References Cited

U.S. PATENT DOCUMENTS 5,612,956 A * 3/1997 Walker et al. ................. 370/545
5,617,541 A   4/1997 Albanese et al. .......... 395/200.3
(Continued)

FOREIGN PATENT DOCUMENTS

EP  0 668 697 A2  8/1995
EP  0 785 675 A2  7/1997
(Continued)

OTHER PUBLICATIONS

Supplemental EP Search Report EP 05 72 4907, dated Feb. 28, 2007.

*Primary Examiner* — Joshua Taylor
(74) *Attorney, Agent, or Firm* — Merchant & Gould P.C.

(57) ABSTRACT

A system and method for transmitting files from a sender to a receiver in a television distribution system, for example, a cable television distribution network, is provided. The files are transmitted without the need for transmitting a directory over an out of band communications link. In an exemplary embodiment, a filename corresponding to a file to be transmitted is provided to a transform. The transform calculates a PID based on the filename. The calculated PID is incorporated into the MPEG2 data stream carrying the corresponding file contents. When an application program running in the receiver requests a file, the filename of the requested file is provided to a transform operating in the receiver. The transmitter and receiver transforms are identical. The transform provides a corresponding PID at its output. The PID is used to tune a PID filter on the receiver end such that the requested file is selected from the incoming MPEG bit stream for processing by the processor.

17 Claims, 7 Drawing Sheets

(51) Int. Cl.
*H04N 21/2362* (2011.01)
*H04N 21/262* (2011.01)

(56) References Cited

U.S. PATENT DOCUMENTS

| | | | |
|---|---|---|---|
| 5,703,877 A | 12/1997 | Nuber et al. | 370/395 |
| 5,953,691 A | 9/1999 | Mills | 702/198 |
| 6,088,784 A * | 7/2000 | Choquette | 712/32 |
| 6,745,192 B1 | 6/2004 | Libenzi | 707/100 |
| 6,970,564 B1 * | 11/2005 | Kubota et al. | 380/210 |
| 6,988,238 B1 * | 1/2006 | Kovacevic et al. | 714/799 |
| 7,359,920 B1 | 4/2008 | Rybicki et al. | 707/104.1 |
| 7,594,254 B2 | 9/2009 | Parnell et al. | 725/146 |
| 2002/0138464 A1 * | 9/2002 | Calascibetta | 707/1 |
| 2002/0149675 A1 | 10/2002 | Abraham et al. | 348/192 |
| 2002/0162114 A1 * | 10/2002 | Bisher et al. | 725/91 |
| 2002/0194613 A1 | 12/2002 | Unger | 725/118 |
| 2003/0018878 A1 * | 1/2003 | Dorward et al. | 711/216 |
| 2003/0093485 A1 | 5/2003 | Dougall et al. | 709/208 |
| 2003/0115222 A1 * | 6/2003 | Oashi et al. | 707/200 |
| 2004/0030547 A1 * | 2/2004 | Leaning et al. | 704/211 |
| 2004/0205152 A1 * | 10/2004 | Yasuda et al. | 709/217 |
| 2004/0228414 A1 | 11/2004 | Keck et al. | 375/240.28 |
| 2005/0114751 A1 | 5/2005 | Ungstad | 714/781 |

FOREIGN PATENT DOCUMENTS

| | | |
|---|---|---|
| EP | 0 849 958 A2 | 6/1998 |
| EP | 0 917 356 A | 5/1999 |
| WO | WO2005094433 | 10/2005 |

* cited by examiner

SYSTEM AND METHOD FOR TRANSMITTING FILES FROM A SENDER TO A RECEIVER IN A TELEVISION DISTRIBUTION NETWORK

CROSS-REFERENCE TO RELATED APPLIACTIONS

This patent application is a continuation of U.S. patent Application Ser. No. 10/805,728, filed Mar. 22, 2004 (U.S. Pat. No. 7,594,254), and entitled "System and Method for Transmitting Files from a Sender to a Receiver in a Television Distribution Network" the disclosure of which is incorporated herein, in its entirety, by reference.

FIELD OF THE INVENTION

The invention relates to electronic information distribution systems. More particularly, the invention relates to television distribution systems and networks including multiplexed bit streams having a system or transport layer and one or more layers of compressed digital video and digital audio data, and more particularly to transport mechanisms for transporting files over said distribution system.

DETAILED DESCRIPTION CABLE SYSTEM

Figure 1:
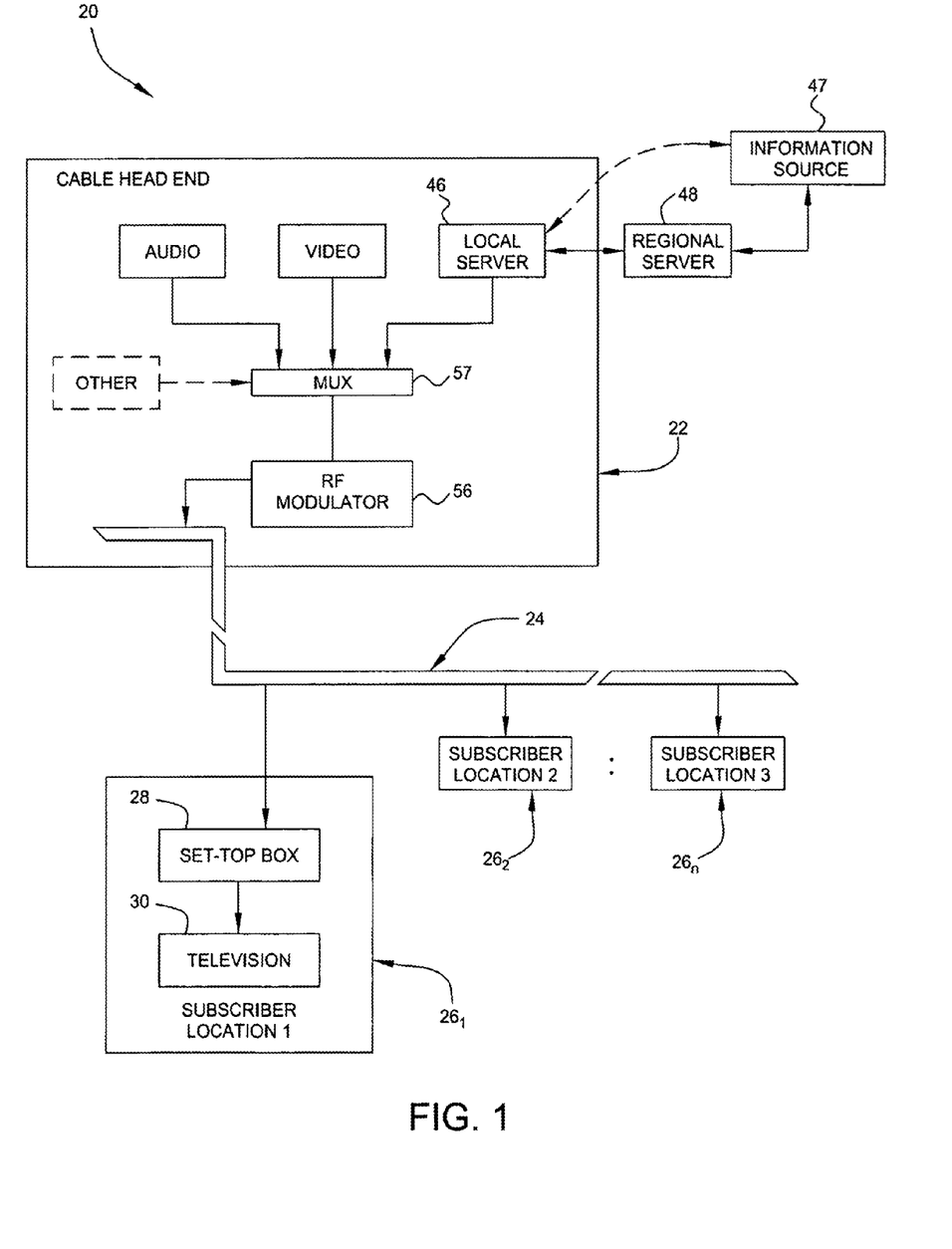
FIG. 1 depicts a block diagram of an information distribution system according to an embodiment of the present invention.

Turning to the drawings and referring first to FIG. 1, there is shown an example of a system generally designated 20 into which the present invention may be incorporated. In general, the system 20 transmits signals comprising video, audio, program guide information and other information from a cable head-end 22 onto a coaxial cable transmission medium 24. The signals are received at a plurality of subscriber locations $26_1$-$26_n$. At least one of the subscriber locations, such as the location $26_1$ at a subscriber end 23 of system 20, includes a digital set-top box 28 or the like equipped to convert the transmitted signals into signals capable of being received by a television set 30 for displaying video images and/or outputting audio, and for displaying television program information to a consumer end-user. Of course, the present invention does not require coaxial cable as the physical transmission medium, as signals can alternatively be transmitted over any transmission medium, including wireless means such as so-called "wireless cable" broadcasts, digital satellite communication, and so on.

As shown in FIG. 1, head-end 22 includes a local server 46 adapted to communicate with at least one information source 47. For purposes of this specification, a "server" is a computer that controls a repository of information files that can be downloaded, transmitted, or manipulated in some manner. The general term server, as used here, includes at least one file storage medium as a repository of information. Suitable file storage media include magnetic and optical disks, magnetic tape, floppy disks, and semiconductor memory including Random Access Memory (RAM), Read Only Memory (ROM) and the like. For purposes of this specification, the term "information" means any representation of knowledge or intelligence, e.g., data, computer programs, messages, files, signals and the like, whether analog or digital. Information further includes multimedia representations and media objects, e.g., still images, video objects, audio objects, text, graphics, and the like.

In one embodiment of the invention, information source 47 provides information such as TV schedule and channel line-ups, as well as cable system channel assignments for electronic programming guide (EPG) services. One example of such an information source is Tribune Media Services (TMS). TMS is a media content company that provides syndicated information and entertainment products to print, electronic and on-air media. Other types information sources 47 include, but are not limited to, movie listings, games, puzzles, lottery information, photos, weather services, advertising, live and archival broadcast of interactive service content including electronic encyclopedias, electronic catalogs, downloadable applications and the like.

In some embodiments of the invention, a regional information server 48 receives information from media service 47. Regional information server 48 then distributes the received information to a plurality of local servers 46. In other embodiments of the invention, information source 47 communicates with local server 46 without the use of regional information server 48. Information is stored in memory on local server 46 in files. For purposes of this specification a "file" is a collection of information that has associated therewith a file identifier, for example, a filename. There are many different types of files, for example, data files, text files, graphics files, video files, program files and the like. File names and their associated indices are typically themselves stored in files known as directory files. In some embodiments of the invention, a filename includes a directory path that identifies the file's location in the directory hierarchy.

In one embodiment of the invention, information source 47, regional information server 48 and local server 46 communicate via the Internet. In an alternative embodiment of the invention, information files are authored on an authoring system (not shown) within cable headend 22 and stored on local server 46, without the need for downloading files from regional server 48 or information source 47.

The contents of files stored on local guide server 46 are multiplexed by multiplexer 57 with program video, audio, and other information to provide a Motion Picture Experts Group 2 (MPEG2) standard data stream. One example procedure for transporting the data stream from the transmitting end to the receiving end of the system, and for thereafter decompressing the bitstream at the receiving end is specified in International Standards Organization (ISO) 13818-1. ISO 13818-1 is the systems, or transport, layer portion of the MPEG 2 standard. This portion of the standard specifies packetization of audio and video elementary packet bitstreams.

The MPEG2 data stream is modulated onto cable transmission medium 24 by modulator 56. In one embodiment, modulator 56 outputs twenty-seven megabits per second (27 Mb/s) MPEG2 transport streams modulated onto an intermediate frequency (IF) carrier. The MPEG2-encoded transport streams are received by an intermediate frequency to radio frequency (IF/RF) up converter which modulates the streams onto six megahertz (analog) channels and injects the signals onto the cable transmission medium 24. With multiplexing of multiple, packetized digital signals per six megahertz analog channel, hundreds of digital channels may be injected onto a single coaxial medium, although at present a mixture of analog and digital channels will likely be transmitted.

DATA CAROUSEL. In one embodiment of the invention, local server 46 includes a carousel delivery application for delivering a carousel 50 (illustrated in FIG. 2) of data files from local file server 46 to set-top box 28. Data from files residing on local server 46 are multiplexed onto at least one channel by multiplexer 57 to produce a carousel data stream for modulation onto a six megahertz channel of the transmission medium 24. The term "carousel" refers to a system in which a data set is repeatedly broadcast so that it may be accessed as required by many receivers. In that manner, files are sequentially relayed in cyclical fashion and thereby made available to set top box 28. A subscriber 26 can interact with the set-top box 28 to selectively display file information from the carousel on the screen of the television set 30. A variety of conventional carousel techniques exist. One example mechanism for periodically broadcasting the data via the broadcast delivery network is defined in the MPEG-2 DSM-CC specification (ISC/IEC 13818-6 IS). Other hardware and software mechanisms for providing a data carousel are suitable for use in embodiments of the invention employing a carousel.

FILE SERVER GENERIC DESCRIPTION. In one embodiment of the invention, local server 46 comprises a rack-mounted personal computer, including an Intel Corporation P6 200 megahertz (or better) central processing unit, 128 megabytes of RAM, a two gigabyte or larger hard disk drive, and an ISDN or better connection to the Internet for communicating with information source 47 and 48. Examples of alternative file storage media suitable for use in embodiments of the invention include, but are not limited to, magnetic and optical disks, random access memory (RAM), read only memory (ROM), tapes and the like. Local server 46 also typically, but not necessarily includes an Ethernet connection to a headend 22 Local Area Network. One example of an operating system suitable for use on Server 46 is Windows NT Server 4.0. It is important to note that many alternative computer systems and operating systems, for example Unix and Linux based servers, are commercially available and suitable for use in the invention. Although only one local server 46 is illustrated in FIG. 1, two or more local servers may be installed in a head-end 22 for purposes of increased reliability, capacity, or redundancy.

Figure 2:
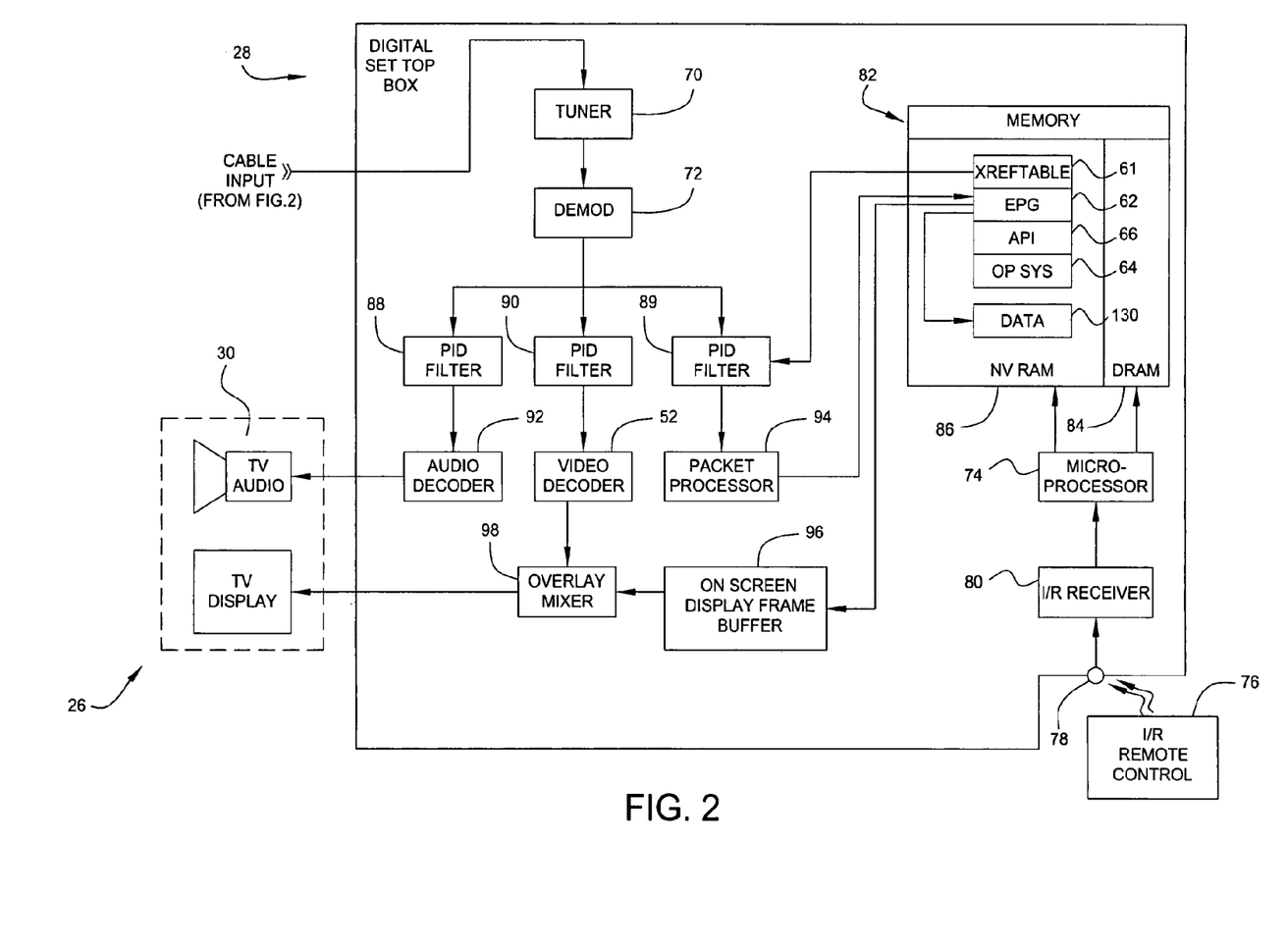
FIG. 2 depicts a block diagram of a receiver suitable for use in the information distribution system of FIG. 1.

RECEIVER. FIG. 2 is a block diagram of an exemplary receiver 28 on subscriber end 23 of system 20. The exemplary receiver is a set top box 28, such as, for example, a DCT-2000 (Digital Consumer Terminal) set top box commercially available from Motorola, Inc. of Horsham, Pa. The DCT-2000 is capable of processing multiplexed MPEG data. In other embodiments, other types of processors are used as receivers. For example, in some embodiments, television 30 includes a cable converter function and other set top box functions without the need for a separate set top unit 28. In other embodiments, receiver 28 is a general purpose computer capable of receiving audiovisual files and other data, using such formats as MPEG I, MPEG II, and MPEG 4, for example. Although the receiver 28 is referred to as a set top box in the discussion of FIG. 2, other embodiments including different types of receivers are suitable for use with the invention.

Although not necessary to the invention, it is significant that with the DCT-2000 set-top box the hardware is unmodified, so that the existing base of publicly distributed set-top boxes may implement the invention without requiring upgrade servicing or replacement. However, to provide enhanced services to subscribers 26, the operation of the box 28 is typically modified by additional application software downloaded thereto. In one embodiment, the application software provided to set top box 28 includes an electronic program guide application program 62 which communicates with an operating system 64 of the box 28 by placing calls through an application programming interface (API) 66. An electronic program guide (EPG) is an application that provides an on-screen listing of all programming and content that an interactive television service subscriber or digital television viewer has available to them. In some cases an EPG includes visual images relating to the promotion, listing or selection of television programs or services, or other services where more than one service is available.

Other embodiments of the invention include other types of application programs for running in set top box 28. These include, but are not limited to, game applications, Channel Hyperlinking™ applications, internet information services applications, to name but a few. Channel Hyperlinking™ is a registered trademark of WorldGate Communications, Inc., and is used to designate application programs that allow a user to request and download content from the World Wide Web via set top box 28. Channel Hyperlinking™ techniques are described in U.S. Pat. Nos. 5,999,970, 5,961,603 and 6,049,539 to Krisbergh and assigned to the assignee of the present invention.

Digital set top box 28 includes an in-band tuner 70, along with an appropriate demodulator 72, for example a 64 quadrature amplitude modulator (QAM) demodulator. Typically, set top box 28 further includes at least one out-of-band (OOB) tuner (not shown) and appropriate OOB demodulator (not shown). An OOB communications link is implemented by an out of band data multiplexer (not shown) at the transmit end, and is typically used by cable television systems to communicate information service-related data to the cable network. This data includes such information as channel maps and email. It is important to note an OOB communication link is not required to implement the present invention.

A microprocessor 74 controls the tuning operation of the tuner 70 and the OOB tuner (not shown) based on commands received from a subscriber via an input device such as a keypad or an infrared remote control device 76, as described below. To receive commands from a subscriber, the set-top box 28 includes an infrared sensor 78 connected to an infrared receiver 80 that provides the command signaling information to the microprocessor 74. In one embodiment of the invention, memory system 82 includes the VRTX operating system 64 stored therein, and generally comprises a combination of volatile dynamic RAM 84 and non-volatile RAM (NVRAM) 86. As those of ordinary skill in the art will readily appreciate, various types and configurations of memory are commercially available and suitable for use in memory system 82.

Figure 3:
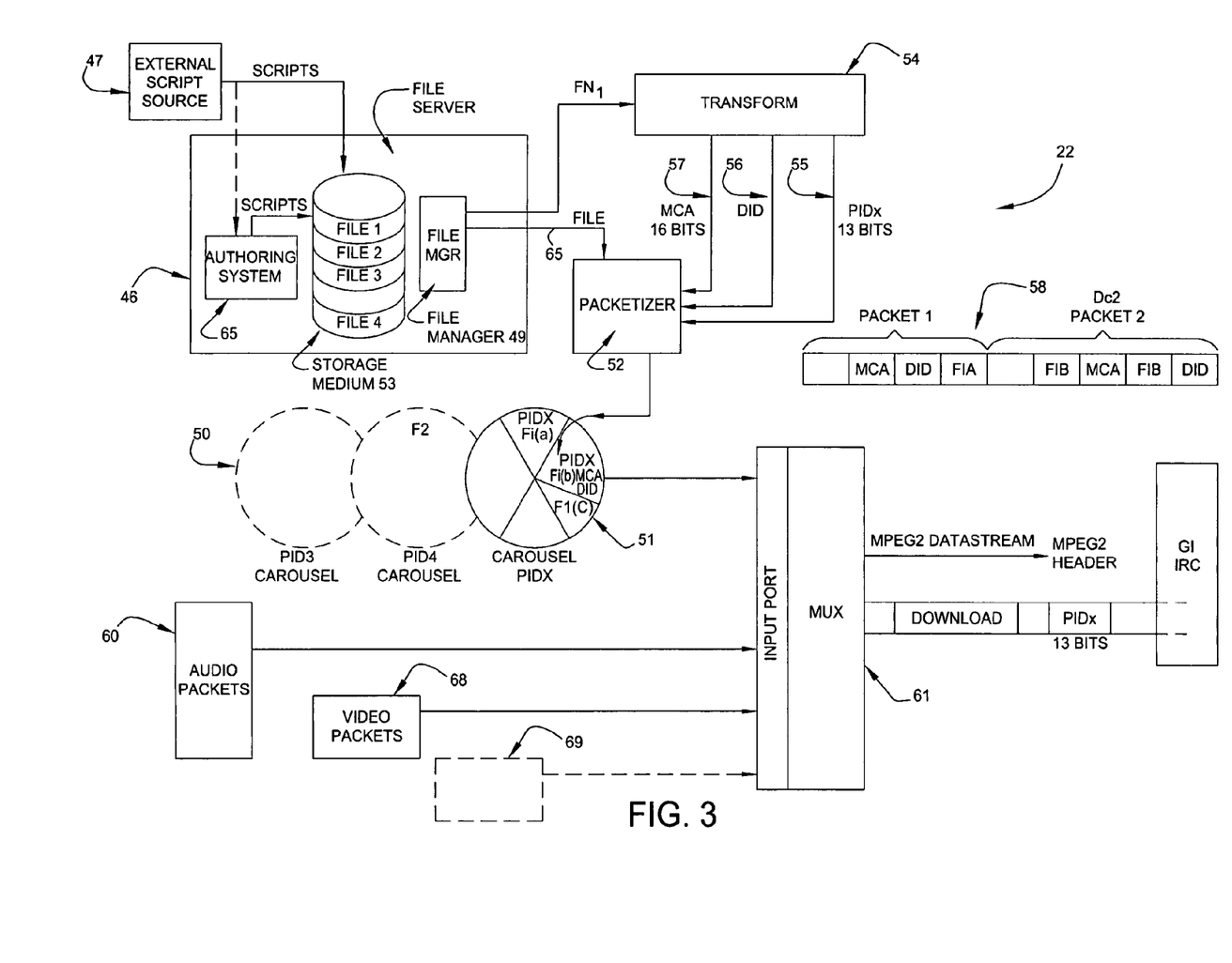
FIG. 3 depicts a block diagram of an information sending system suitable for use in the information distribution system of FIG. 1.

In accordance with digital broadcasts wherein digitized channels are multiplexed as data packets onto a six megahertz analog channel, the set-top box 28 also includes at least three packet identification (PID) filters 88-90 to extract the appropriate encoded data packets for a user-selected digital channel. Based on the user-selected display, audio and other requirements, microprocessor 74 writes an identification value (PID) to each of the PID filters 88-90, whereby the filters 88-90 pass only those packets corresponding to the written PID value. As shown in FIG. 3, one of the PID filters, filter 88, provides the filtered packets to an audio decoder 92 which decodes the digital audio data while another PID filter 90 provides filtered packets (for example, MPEG2 encoded packets) to the video decoder 52.

At least a third PID filter 89 is provided to extract other data, including data from files stored on file server 46. A packet processor 94 handles those packets. The set-top box is also equipped with an on-screen display frame buffer (OSD) 96 capable of superimposing alphanumeric characters, other symbols and bitmap graphics over a displayed image. To accomplish this superimposition, an overlay 98 is provided to appropriately combine the video outputs of the video decoder 52 and the OSD 96.

GENERAL FUNCTION. The cable box 28 functions when the user provides an appropriate command to the cable box 28. For example, in response to a digital channel selection command, the microprocessor 74, tunes the in-band tuner 70 to an appropriate analog channel based on the digital channel selected by the subscriber 26. If a digital channel was selected, a table or the like stored in the memory 82 determines the analog channel that carries the digital channel's packets, along with the packet identification numbers (PIDs) corresponding to the selected digital channel, for writing into the PID filters 88 and 90. Once the PIDs have been written, the audio and video decoders 52 and 92 will receive the appropriate packets and decode and output appropriate signals.

"ELECTRONIC PROGRAM GUIDES" Advances in technology continue to create a wide variety of services and programs offered to users via television and other video equipment, such as video recorders connected to set top box 28. Such content is disseminated via cable, satellite, broadcast, and terrestrial systems. Content includes, but is not limited to, traditional broadcast and cable television programs, video services such as pay per view (PPV), near video on demand, promotional channels, game channels, localized or specially formatted information, cable delivered Personal Computer (PC) based content and services, Internet based content and services, and interactive services. Electronic Program Guides (EPGS) provide users with a means for viewing, selecting, interacting with and otherwise controlling available programs, features and services available to them.

RECEIVER—GUIDE DATA. One embodiment of the invention provides a system and method for transporting information files for use in an EPG. In one embodiment of the invention, an EPG is provided on at least one digital channel. In response to a viewer's command to view the EPG, the microprocessor 74 tunes the in-band tuner 70 to an appropriate analog channel based on the digital channel associated with the EPG. At least one table or the like stored in the memory 82 is utilized to determine the radio frequency that carries the selected digital channel's packets. At least one table identifies the PIDs corresponding to the selected channel's audio, video and data. The PIDs are written into the PID filters 88 (for guide audio, if any) and 90 (for video, e.g., background video).

To obtain a file from the carousel, a third PID filter 89 is written with a PID corresponding to the file's filename. Once the data PID has been written to PID filter 89, packet processor 94 will receive the appropriate packets and decode and output appropriate data, for example, data for program guide application 62.

ASSOCIATING PIDS WITH FILENAMES Regardless of the application running in set top box 28, in order to obtain the contents of a desired file, the PID corresponding to the data stream carrying the desired file in the carousel must be written to PID filter 89. According to one technique, a PID associated with a desired file is obtained from a cross reference table 61 or the like stored in the memory 82. The cross reference table contains directory information that cross references a file identifier, such as a filename, to a corresponding PID that carries the desired file's packets. Typically, such a cross reference table is transmitted from headend 22 to set top box 28 on an Out of Band (OOB) communication link. However, in some embodiments of the invention, the cross reference table is transmitted on an in-band channel.

The PID thus obtained from the cross reference table is used for writing into the PID filter 89. The data passing through the PID filter is provided to application program 62. This approach has a drawback in that the directory information is transmitted on an OOB communications link. The OOB communications link is relatively slow compared to the data transfer rate of in-band communications link. Due to data rate limitations, the OOB communications link sometimes encounters problems when attempting to transmit a directory containing more than about 60 files within the nominal period allowed between successive transmissions of the directory.

Derived Approach.

TRANSMIT END. FIG. 3 illustrates in more detail, an embodiment of sender system 22 illustrated in FIG. 1. FIG. 3 illustrates a system and method for associating a filename with a PID, without the need for an OOB communications link. As previously described, local file server 46 includes at least one storage medium 53, file manager 49, and in some embodiments, at least one authoring system 65. Files comprising scripts are stored on storage medium 53. Script files are downloaded from an external script source 47, for example information source 47 and national server 48. In some embodiments, files are provided to storage medium 53 by authoring system 65. File manager 49 provides files from storage medium 53 to the remainder of system 22 for transport to subscriber set top boxes 28.

TRANSFORM. File contents 65, e.g., data, of respective files from storage medium 53 are provided to packetizer 52. A file identifier, e.g., filename corresponding to each respective file to be transported is provided to transform 54. In one embodiment of the invention filenames are provided as American Standard Code for Information Interchange (ASCII) coded bits. As those of ordinary skill in the art will recognize, other types of bit coding techniques exist and are appropriate for use in the present invention to represent filenames. Transform 54 operates on a filename at its input to provide, at its output a plurality of bits representing a PID 55. In one embodiment of the invention, PID 55 comprises 13 bits in accordance with the MPEG2 systems specification. In addition to PID 55, alternative embodiments of the invention include bits representing a Data Identifier (DID) 56 and a Multicast Identifier (MCI) 57. DID 56 and MCI 57 are utilized to further distinguish filenames in the event more than one filename is assigned the same PID. Using PID portion 55 alone, the probability of the same PID being assigned to more than one filename is about 1 in $2^{13}$ in one embodiment of the invention. Using PID portion 55 together with DID portion 56 results in a probability of about 1 in $2^{45}$ that the same PID will be assigned to more than one filename. In embodiments wherein all three portions, PID, DID and MCI are utilized, the probability of the same PID being assigned to more than one filename is about 1 in $2^{61}$ (virtually zero). In one embodiment of the invention, for each filename at its input, Transform 54 provides an MCI comprising 16 bits, a DID comprising 32 bits, and a PID comprising 13 bits. It is to be understood that the terms, DID and MCI are used herein merely for convenience in designating portions of the output of transform 54.

Therefore, many designations for these bit portions could be devised and all such designations remain within the scope of the invention.

Transform 54 operates such that its output is deterministic for a given filename, that is, the same filename always produces the same transform output. Second, no two filenames are likely to produce the same output as discussed above. In one embodiment of the invention, transform 54 operates such that relatively small variations in filenames at its input produce relatively wide variations in the corresponding bit patterns at its output. Transform 54 will be described in more detail below.

DC2 Packets

File manager 49 provides file contents 65 to packetizer 52. Packetizer 52 portions the contents of the file into at least one data packet. Packetizing allows for compressed video and audio images to be transmitted over high bandwidth channels such as satellite transmission. In embodiments of the invention wherein an MCI and a DID are utilized, Packetizer 52 inserts the MCI and the DID provided by transform 54 into at least one data packet along with file contents 65. In a data carousel embodiment of the invention, packetizer 52 provides data packets to carousel system 50. Carousel system 50 comprises a plurality of individual carousels, one carousel per PID. Packetizer 52 utilizes the PID output 55 of transform 54 to direct the data packets to a corresponding PID carousel of data carousel system 50. Each PID carousel comprises a plurality of packets corresponding to a file to be transported on that PID. In some embodiments thousands of PIDs comprise a carousel system.

Packetizer 52 formats files into data packets in accordance with a formatting convention. One example of a packet formatting convention suitable for use in the invention is the Digicipher II (DC2) format. DC2 is a proprietary format of General Instruments Corporation. Other known techniques for encoding/decoding video images include the Motion Picture Expert Group (MPEG) techniques MPEG1 and MPEG 2. Current encoding/decoding standards for video telephony include the H.261 and H.263 standards.

Figure 7:
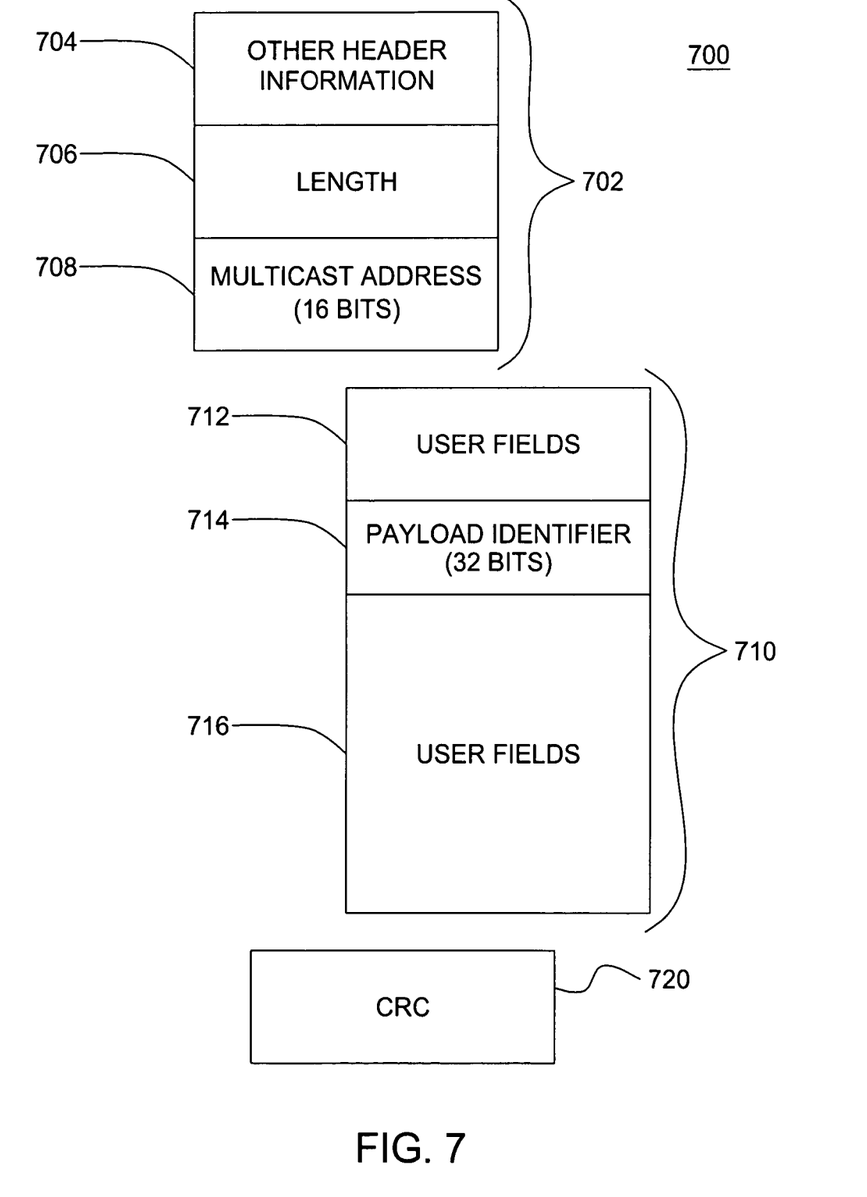
FIG. 7 is a block diagram of a DC2 packet structure suitable for use with the present invention.

FIG. 7 is a diagram of a DC2 packet 700 adapted for use in the invention. Packet 700 includes header 702, including a length field 706, an MCI 57, and other header information 704 used in the DC2 format. The user fields 710 include the DID 56, payload data 716 and other user defined fields 712. A cyclic redundancy code 720 follows the user fields 710.

Therefore, in embodiments of the invention employing an MCI and a DID, each DC2 Packet comprises an MCI, a DID and at least a portion of the data representing the contents of a given file. In many cases a plurality of DC2 packets will be utilized to convey the contents of a single file. Each of the packets corresponding to a given file is assigned the same PID as determined by transform 54.

Figure 5:
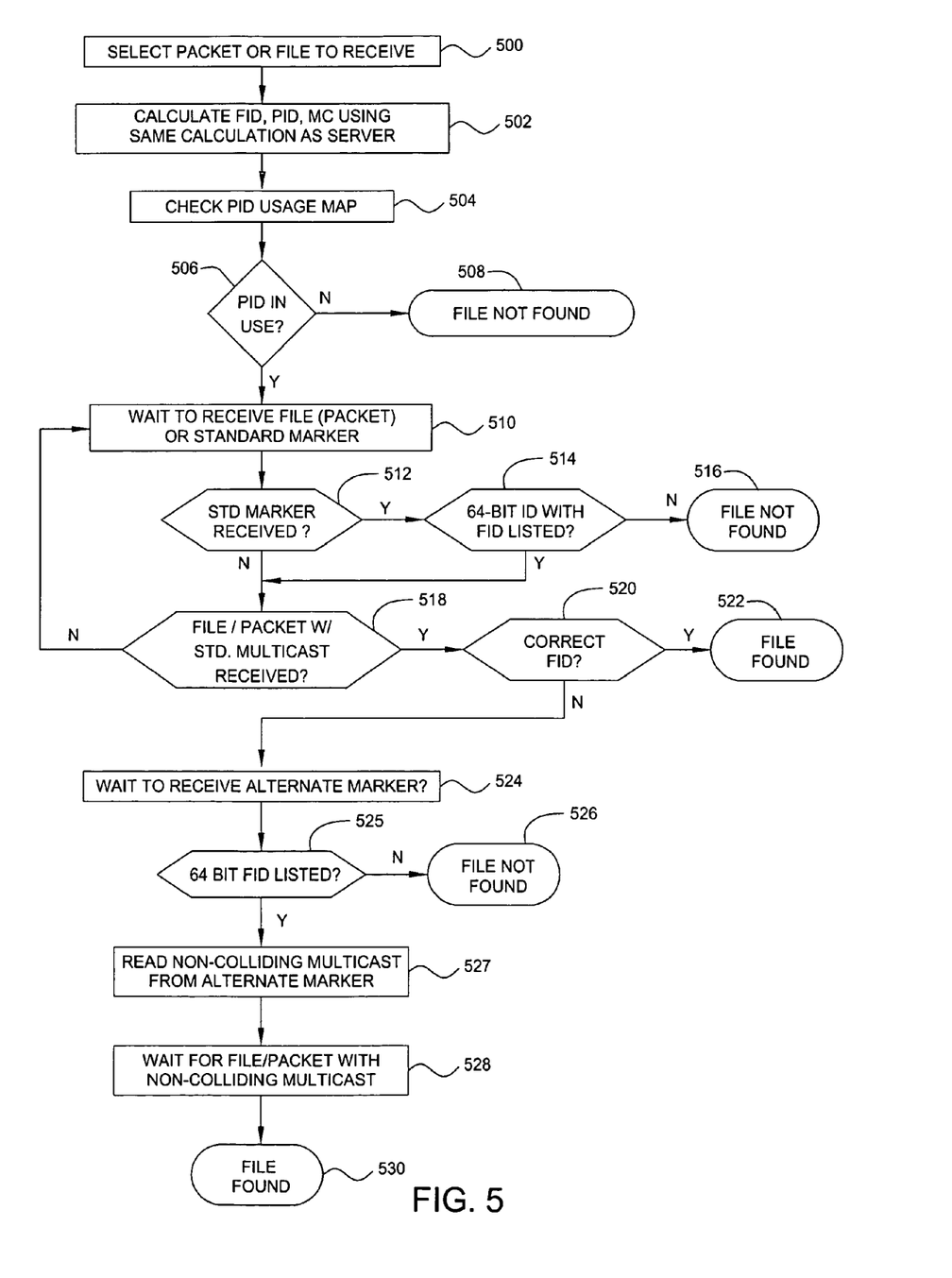
FIG. 5 depicts a flow diagram of a packet receiving method according to an embodiment of the invention.

MPEG2 PACKETS. Returning now to FIG. 3, multiplexer 61 combines inputs provided by carousel system 50, as well as audio 67, video 68, and other 69 packetized inputs to provide a data stream comprising MPEG2 packets for modulation onto a six megahertz channel of the transmission medium 24. An example of an MPEG2 packet according to an embodiment of the invention is illustrated in FIG. 5. Each MPEG2 packet 100 comprises a header portion 110 and a payload portion 150. Together, header portion 110 and payload portion 150 comprise 188 bytes. Header 110 is further portioned into fields. Of particular interest in the present invention is PID field 112. This field comprises the PID corresponding to a file to be transported. Payload portion 150 comprises at least one DC2 packet. Typically a plurality of MPEG2 packets will comprise a single DC2 packet. However, according to an embodiment of the invention, all DC2 packets corresponding to a given file will be carried by MPEG2 packets having the same PID.

The multiplexed data stream may be transmitted over a variety of links. In one embodiment of the invention, the link is a Cable television plant. Other links suitable for use in the invention include, standard Radio Frequency Links (UHF/VHF), Digital Broadcast Satellite Links, Standard Terrestrial Communication Links (PDH, SDH), Microwave Line of Sight (LoS) Links (wireless), Digital Subscriber Links (ADSL family), and Packet/Cell Links (ATM, IP, IPv6, Ethernet) to name but a few.

Figure 6:
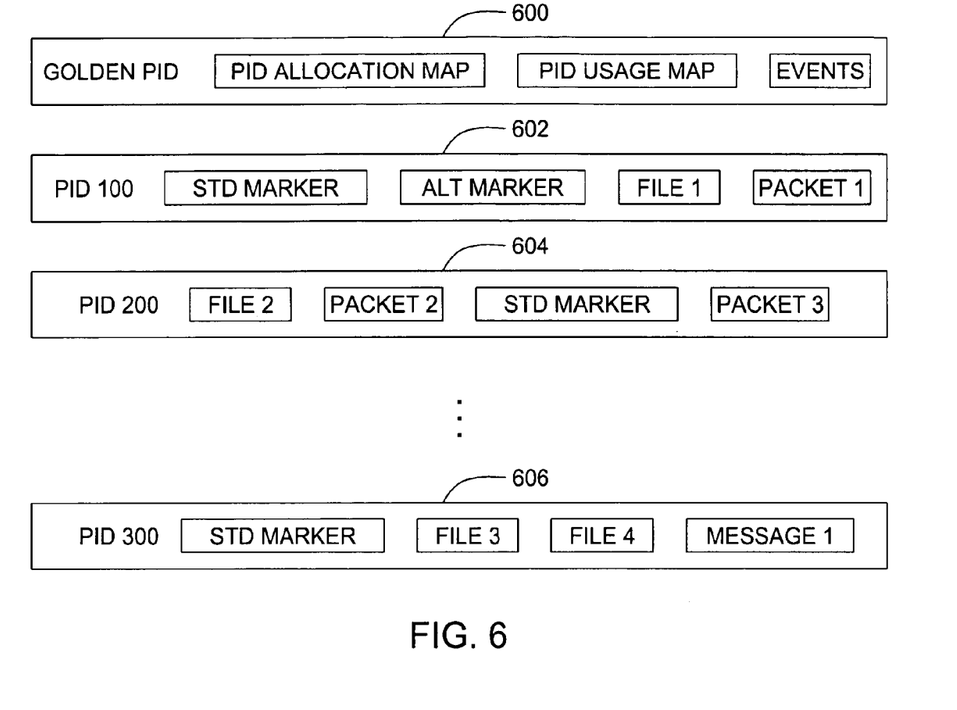
FIG. 6 is a block diagram of sample data being transmitted via several PIDs.

DETAILED DESCRIPTION OF TRANSFORM. Turning now to FIG. 6, there is shown a functional block diagram of a transform 54 according to an embodiment of the invention. Transform 54 comprises a calculating function 300 and a PID look-up table (PLT) 305. First, the PLT will be discussed.

PLT 305 is derived from the Program Specific Information (PSI) for an MPEG2 compliant system.

In order to construct the PLT of the invention, at least one range of PIDs available for transport of files is determined. In an MPEG implementation of the invention PIDS are assigned in accordance with the requirements of the MPEG specification and the requirements of the specific system in which the invention is implemented from the Program Specific Information (PSI). PLT 305 is constructed by identifying available PIDs, listing the PIDs in a table 305, and providing an index 307 into the listing 306. PLT 305 is transported from headend to receiver on a private data stream. In accordance with MPEG convention, the PID for the private data stream used to transport PLT 305 is identified in the Program Map Table.

Calculating function 300 operates on respective filenames at its input to provide corresponding indices 307 at its output. Any calculating function having the following constraints is suitable for use in the invention. First, calculating function 300 provides a substantially unique, and repeatable index for each respective filename. Further, the indices provided by calculating function 300 have substantially a one to one correspondence to entries on the PLT.

In accordance with one embodiment of the invention, indices are calculated as follows. Respective file identifiers in the form of ASCII strings are provided to a checksum generator (CG) 320. in one embodiment of the invention, CG 320 performs a CRC on the respective ASCII strings to provide a corresponding 64 bit checksum for each file In alternative embodiments of the invention, a hash function is utilized to provide the 64 bit checksum. In other embodiments, the function is a pseudorandom number generator is utilized to provide the 64 bit checksum.

A selected 16 bit portion (designated X) of each 64 bit checksum is provided to a modulo divider 321. In one embodiment of the invention, the 16 MSBs of the 64 bit checksum comprise X. Modulo divider 211 provides a PID index 301 at its output for each X at its input. The size of the index 301 is chosen such that all of the PID entries available for use in PID map table 305 can be accessed. The number of available PID entries listed on table 305 is denoted NPIDSON. In one embodiment of the invention, the PLT table has 4096 entries and the index comprises 12 bits. Other embodiments of the invention have alternative sizes in accordance with the requirements of the system in which the invention is implemented. Modulo divider 301 operates on X to generate PID index 301 in accordance with the relationship:

$$\text{PID index} = X \text{ modulo NPIDSON} \qquad (1)$$

The PID index thus generated provides an index into the PLT.

As discussed above, some embodiments of the invention employ at least a second identifier, in addition to the PID, in the event that two filenames are assigned the same PID. In one embodiment of the invention, a DID and an MCI comprise the remaining 32 and 16 Least Significant Bits (LSBs) respectively of the 64 bit output of CG 320. The choice of which bits, MSBs or LSBs, are utilized is a matter of convenience and either convention is suitable for use in the invention.

One of many alternative embodiments of a calculating function for providing a PID, DID and MCI is illustrated in FIG. 7. Filename FN is provided to checksum generator (CG 320). CG 320 provides a 64 bit checksum at its output. The 64 bit checksum is portioned into 4 consecutive 16 bit fields. The four 16 bit fields are provided to XOR function 322 where they are combined in accordance with an exclusive or operation to provide a 16 bit output X to a modulo divider 321, As described above, modulo divider 301 operates on X to generate PID index 301 in accordance with the relationship:

$$\text{PID index} = X \text{ modulo NPIDSON} \qquad (1)$$

In similar fashion, two of the 16 bit fields are provided to a second XOR function 325. The 16 bit output of XOR function 325 is used as the MCI in embodiments of the invention which employ an MCI to lower the probability of collision.

In some embodiments of the invention, a DID is formed by concatenating, i.e., stringing together, two 16 bit fields of the 64 bit output of CG 320. The concatenating operation is performed by concatenator 330. In the embodiment illustrated in FIG. 2, the two least significant 16 bit fields are provided to concatenator 330. However, the choice of which two 16 bit fields are provided to concatenator is not critical to the invention. Any two 16 bit fields can be utilized. However, the probability of the event that two filenames being assigned the same PID is related to the degree of correlation between the PID, the MCI and the DID. The lower the correlation, the lower the probability of that event. Therefore in embodiments of the invention wherein the lowest correlation is desired, the two 16 bit fields chosen to form the DID are different from the two 16 bit fields chosen as a basis for the MCI.

Substantially identical transforms operate in both the sender and the receiver. Both the sender and the receiver employ substantially identical PLTs. The receiver acquires the PLT when it first tunes to the in data band channel.

Changes at the File Server

The contents of file server 46 are subject to change. Files events such as file removal, moving in the directory structure and file updates, to name a few, can occur. In many cases, these changes are relevant to at least one application program 66 running in receiver 28. In one embodiment of the invention, receiver 28, and application program 66 is periodically notified of these types of events. In one embodiment of the invention, notification of file events is provided to receiver 28 via an MPEG2 private data channel. The PID for the private data channel is provided in the PMT. Headend 22 constructs and delivers events and partial directories (referred to as "directory markers") as they change, eliminating the need for the file manager 206 to maintain and permanently store them, and providing real-time synchronization of events and markers with the files to be transported. The available CRC information is also fed back to the server 202, which uses the information for creating standard and alternate markers containing subsets of the directory information.

The exemplary golden PID carries two bitmaps and the starting PID number. The first bitmap is the PID allocation bitmap which indicates which PIDs are used in the PID calculation.

The second bitmap is the PID usage bitmap (described above), which indicates which PIDs are currently in use. This is a subset of the allocated PIDs. The PID usage bitmap is a standard bitmap shipped with the least significant bit first, i.e., bit 7 of byte 0 corresponds to the first PID in the map.

"File not Found" and Collision Conditions

A receiver calculates the CRC and PID for a desired file, writes the PID to a PID filter, and waits for MPEG2 data packets assigned to that PID. If the desired data packets arrive within a predetermined period of time, then the file is received. If the predetermined period of time passes, and the receiver has not received the desired unit of data, a "file-not-found" condition exists in which the desired data are considered unavailable. In other embodiments, such as the examples described below, additional features are provided to more rapidly identify a file-not-found condition, to reduce the amount of time it takes the receiver to detect a file not found condition.

Reference is again made to FIG. 2. The file manager 206 includes a directory mapper (described below with reference to FIG. 4) associated with the representative number; the directory mapper generates and transmits to the set top apparatus 250 a partial directory (e.g., marker 416 shown in FIG. 4) identifying each of the at least one file that has respective directory information that transforms to that same PID.

In some embodiments, to detect a file-not-found (FNF) condition with a reduced latency, a combination of strategies is used. Directory "markers" (as shown in Tables 1 and 2, below) are spun periodically on each PID that carries data, as described in greater detail with reference to FIGS. 4-6. The standard markers contain the 64-bit DID number of each file being spun on the PID over which the marker is sent. In these embodiments, the markers provide PID specific directory information. If the settop 250 sees one of these markers before it sees the file it is attempting to load, it reads the marker to determine whether the file actually exists. The marker spin rate is determined empirically by balancing bandwidth consumption against the desired FNF detection time.

Figure 4:
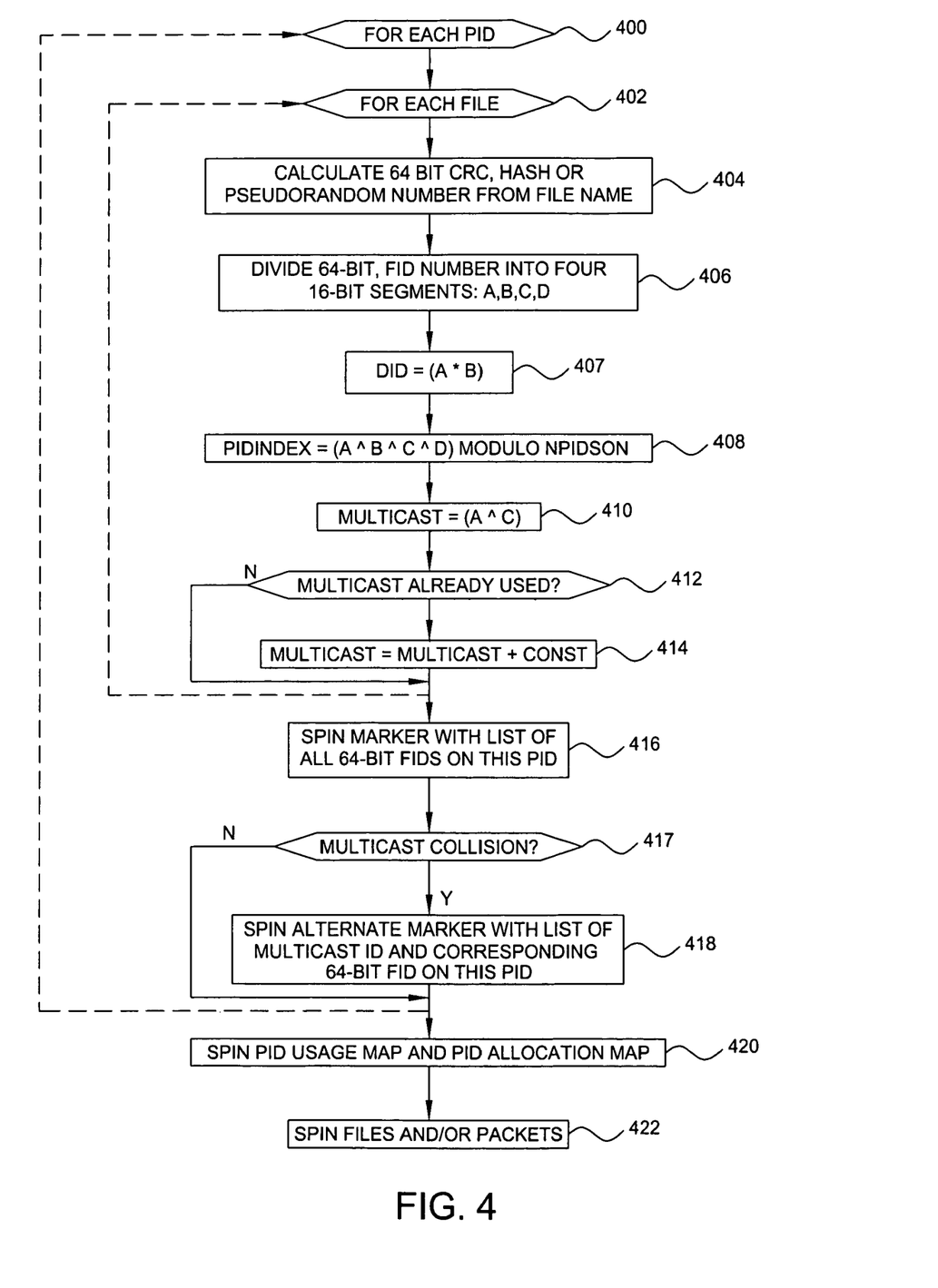
FIG. 4 depicts a flow diagram of a data identifier (DID) and packet identifier (PID) processing method according to an embodiment of the invention.

FIGS. 4 and 5 show the identifier calculation, collision avoidance and FNF latency reduction methods. FIG. 4 is a flow chart diagram showing one example of how a sender (e.g., a cable headend) performs the DID and PID calculation and transmits the data.

At step 400, the main loop of steps 402-418 is repeated for each PID to be used.

At step 402, an inner loop including steps 404-414 is repeated for each unit of data (e.g., file) to be transmitted by the sender.

At step 404, the sender performs the transform by generating a number with an approximately uniform probability distribution, as a function of a bit sequence (e.g., file name) associated with a unit of data (e.g., packet, file) to be transmitted. The term "function" implies that a given bit sequence only produces one value, in a reproducible manner. If the same bit sequence is input to the transform function three times, the same output is generated three times. In the exemplary embodiments, the generated number is the 64 bit binary number (DID) described above. The 64-bit length is selected to provide an extremely small likelihood that two different file names will yield the same calculated number. Some embodiments use smaller number lengths to provide any desired probability that two file names will not yield the same number. Other embodiments use larger number lengths to provide any desired probability that two file names will not yield the same number.

At step 406, the 64-bit DID is divided into four 16-bit segments (A, B, C and D), corresponding to the most significant 16 bits, the second most significant 16 bits, the third most significant 16 bits and the 16 least significant bits.

At step 407, the payload ID (PIF) is determined by concatenating the 32 most significant bits of the 64-bit DID.

At step 408, a first portion of the DID is used to calculate the PID. In some embodiments, the PID index in the allocation map is determined by the following equation:

PID index=X modulo NPIDSON, where PID is the MPEG program ID; X is a result of performing at least one XOR operation on at least two portions of the DID (e.g., cyclic redundancy code, hash function, pseudorandom number); and NPIDSON is a number of packet processors to which payload files are being sent.

In the exemplary embodiment, all four portions A, B, C and D of the 64-bit DID are XOR'ed together to form X. NPIDSON is any predetermined number (e.g., 2000 PIDs) that does not exceed the available number of PIDs (e.g., 8192) for the type of receivers being connected to the sender. The PID offset equals the value output by the PID allocation map table given the PID index. Once the PID index is determined, a number of on-bits in the PID allocation map are counted, and the PID offset corresponding to the number of counted PIDs provides the assigned PID number. That is, the PID index is an input to a table lookup that outputs the PID offset. The STARTPID value is then added to the PID offset, where STARTPID is a constant value (corresponding to the first PID being used in the PID usage bitmap).

At step 410, a second portion of the number is used as a multicast identifier. In some embodiments, the multicast identifier is formed by performing an XOR operation on two non-contiguous portions of the PIF. In the exemplary embodiment, the multicast identifier is a 16-bit number determined by XORing portions A and C of the 64-bit DID.

To allow the receiver to initially recognize a desired unit of data (e.g., packet or file) based on the multicast identifier, it is desirable for the system to assign a unique multicast identifier to each unit of data. However, because there is multiple units of data transmitted with the same PID, and there are only 65,536 possible 16-bit multicast ID's, it is possible for two files with two different bit sequences (e.g., two different file names) to have the same multicast ID. Thus, in this embodiment, a multicast collision detection and correction feature is provided.

At step 412, a determination is made whether the same multicast ID calculated at step 410 has already been assigned to a previous unit of data with a different bit sequence (e.g., file name). This condition is referred to herein as a multicast collision condition.

At step 414, if the sender has detected a collision condition, the sender generates a non-colliding multicast identifier for the second file (packet). In some embodiments, this is accomplished by, for example, adding a constant value to the multicast identifier calculated in step 410, for which the collision condition is detected. The non-colliding multicast address has the same length as the standard multicast address calculated in step 410, for example, 16 bits.

At step 416, in some embodiments, the sender periodically transmits (spins) a standard marker packet or message that includes a list of all of the 64-bit DIDs for the sets of at least one packet (e.g., packets, files, messages) to be sent using the given PID on which that marker is sent. In other embodiments, a file is sent instead of a marker. The marker is a partial directory that only covers the units of data spun on a single PID. A marker is spun on each P!D carrying broadband data.

In some embodiments, the marker spins at the rate of once every 5-10 seconds. Higher spin rates are possible, but consume more bandwidth. In the exemplary embodiment, the standard marker is a packet, as opposed to a file, and the calculation of PIFDID and PID does not apply to the marker. Instead, a predetermined PID is used to send the markers.

Table 1 shows an example of the contents of a standard marker. In Table 1, each cell $b_{i,j}$ represents the $j^{th}$ portion of the 64-bit DID at row i, of a standard marker containing n entries, corresponding to n sets of at least one packet. Each row of the marker contains four segments A, B, C and D, and corresponds to a single set of at least one packet. Concatenating the four entries $b_{i,j}$ to $b_{4j}$ in any row forms the full 64-bit calculated DID for one of the sets of at least one packet. Note that in an actual marker, there is no demarcation between the four portions of each 64-bit DID; the cells are only shown as broken into 16-bit chunks for ease of explanation.

TABLE 1

| | | | |
|---|---|---|---|
| $b_{1,1}$ to $b_{1,16}$ | $b_{1,17}$ to $b_{1,32}$ | $b_{1,33}$ to $b_{1,48}$ | $b_{1,49}$ to $b_{1,64}$ |
| $b_{2,1}$ to $b_{2,16}$ | $b_{2,17}$ to $b_{2,32}$ | $b_{2,33}$ to $b_{2,48}$ | $b_{2,49}$ to $b_{2,64}$ |
| $b_{3,1}$ to $b_{3,16}$ | $b_{3,17}$ to $b_{3,32}$ | $b_{3,33}$ to $b_{3,48}$ | $b_{3,49}$ to $b_{3,64}$ |
| . | . | . | . |
| . | . | . | . |
| . | . | . | . |
| $b_{n,1}$ to $b_{n,16}$ | $b_{1,17}$ to $b_{n,32}$ | $b_{n,33}$ to $b_{n,48}$ | $b_{n,49}$ to $b_{n,64}$ |

In some embodiments, the standard marker for each PID is sent using that PID. Thus, the directory information is sent inband, instead of using the OOB channel. For example, if each PID corresponds to a channel, the marker for a given PID is sent on the channel to which that PID corresponds. Similarly, in embodiments having a PID processor for each PID, each respective PID processor is sent the marker file for units of data to be sent to that PID processor. In other embodiments, the standard markers are all sent on the OOB channel. In these embodiments, each marker includes a means by which the receiver is able to identify the PID to which that particular marker pertains (because the OOB channel contains markers corresponding to multiple PIDs on the inband channel).

For a relatively large multicast address (e.g., 16-bits) and relatively large number of PIDs (e.g., 2000) relative to the number of units of data (e.g., 35,000), there is a low probability of two different sets of at least one packet having the same multicast ID. In other words, in the vast majority of cases, for any given PID, any two units of data having the same multicast ID have a high probability of corresponding to the same set of at least one packet. Thus, packet recognition by a recipient is generally achieved more rapidly by comparing the calculated multicast ID to the multicast ID of a received unit of data. That is, packets having a different multicast address from that of the desired file is quickly eliminated from consideration without examining the PIF (32 MSBs of the 64-bit DID) contained in the packet. The PIF is only examined if the desired multicast address is found. However, in preferred embodiments, a multicast collision detection and correction mechanism is desired to positively identify when a multicast collision exists, and eliminate the condition.

At step 417, a determination is made whether a multicast collision exists. If there is no multicast collision, then step 418 is skipped, and step 420 is executed next.

At step 418, in some embodiments, the sender periodically transmits (spins) an alternate marker packet if the sender detects a multicast collision. The alternate marker includes a list of the multicast identifier and the 64-bit DID for each of the sets of at least one packet (e.g., packets, files, messages) to be sent using a given PID. In some embodiments, a message is sent instead of an alternate marker. In other embodiments, a file is sent instead of an alternate marker. Table 2 shows an example of the contents of the alternate marker. In Table 2, each row of the alternate marker corresponds to a single set of at least one packet. The last cell in each row includes the standard multicast address calculated at step 410 (or the non-colliding multicast address if step 414 was executed). Each remaining cell in each row represents the set of 16 bits at row i of an alternate marker containing n entries, corresponding to n sets of at least one packet.

TABLE 2

| | | | | |
|---|---|---|---|---|
| $b_{1,1}$ to $b_{1,16}$ | $b_{1,17}$ to $b_{1,32}$ | $b_{1,33}$ to $b_{1,48}$ | $b_{1,49}$ to $b_{1,64}$ | $MC_1$ |
| $b_{2,1}$ to $b_{2,16}$ | $b_{2,17}$ to $b_{2,32}$ | $b_{2,33}$ to $b_{2,48}$ | $b_{2,49}$ to $b_{2,64}$ | $MC_2$ |
| $b_{3,1}$ to $b_{3,16}$ | $b_{3,17}$ to $b_{3,32}$ | $b_{3,33}$ to $b_{3,48}$ | $b_{3,49}$ to $b_{3,64}$ | $MC_3$ |
| . | . | . | . | . |
| . | . | . | . | . |
| $b_{n,1}$ to $b_{n,16}$ | $b_{1,17}$ to $b_{n,32}$ | $b_{n,33}$ to $b_{n,48}$ | $b_{n,49}$ to $b_{n,64}$ | $MC_n$ |

Using the alternate marker of Table 2, a receiver that receives a file having the desired multicast address, but the wrong 32-bit PIF checks the alternate marker and determines the non-colliding multicast address corresponding to the DID. Then the receiver waits for a unit of data (e.g., file) having the non-colliding multicast address. In some embodiments, the alternate marker for each PID is sent inband using that PID. For example, where each PID corresponds to a channel, the alternate marker for a PID is sent over the channel corresponding to that PID. Similarly, in embodiments having a PID processor for each PID, each respective PID processor is sent the marker file for units of data to be sent to that PID processor. In other embodiments, the alternate markers are sent over the OOB channel, and each alternate marker contains a means by which the receiver identifies to which PID that marker corresponds.

The PID allocation map is a bit map having a bit for each PID number capable of being allocated. The bits corresponding to allocated PIDs are set to a first value indicating allocation, and the remaining bits are set to a second value indicating that those PIDs are not-allocated. The PID allocation map is run-length encoded (RLE), with the high bit of each byte indicating the run type ('1' equals 'allocated'), terminated by a zero byte. In practice, the user determines how many PIDs to allocate, and the system selects which PID numbers are allocated to PIDs. A PID usage bitmap indicates which PIDs are currently in use. This is a subset of the allocated PIDs. Any allocated PID for which data are currently being spun has its respective bit set in the PID usage bitmap.

At step 420, the sender periodically transmits a PID usage map. (Although FIG. 4 shows the PID usage map being spun after the standard and alternate markers, the markers are spun on each PID after the PID usage map is spun.) The PID usage map identifies which PIDs are being used to transmit data. For example, in an exemplary system wherein 13 bits are used to specify the PID, and about 2000 PIDs are actually used, about one fourth of the 8192 available PIDs are used. The PID usage map identifies which of the PIDs are used. In some embodiments, the PID usage map is a packet (PID usage bitmap) having one bit for each PID, with the value of each bit indicating whether that PID is being used. In some embodiments, the PID usage map is sent using a separate PID that is shared by all of the receivers referred to herein as the "golden PID." In some embodiments, the PID usage map is sent in a message instead of an alternate marker. In other embodiments, the PID usage map is sent in a file instead of a marker.

At step 422, the sender transmits the units of data using the appropriate PIDs. Each unit of data contains the appropriate PIF in its payload and multicast identifier in its header. If a non-colliding multicast ID was generated for a given unit of data, then that unit of data is transmitted using the non-colliding multicast identifier.

In some embodiments, the alternate marker is sent less frequently than the standard marker. The periods for the standard and alternate marker determine the delay that is incurred before a file-not-found condition is recognized in the case of an unavailable file for which the calculated PID is in use. That is, once the PID associated with a desired unit of data is determined to be in use (based on the PID usage map), a file-not-found condition is not detected until: the standard marker is received (in the absence of a multicast collision) or the alternate marker is received (when there is a multicast collision), or the receiver times out without receiving a marker or the desired file. Because the FNF condition is determined based on either the standard or alternate marker contents, a high spin rate is not needed for the alternate maker to maintain a low FNF latency.

FIG. 5 shows a method for receiving a desired packet associated with a bit sequence from a server.

At step 500, the receiver (e.g., a set top box) selects a set of at least one unit of data (e.g., packet, file) to receive.

At step 502, the receiver calculates a DID, PIF, PID and a multicast ID from the bit sequence (e.g., file name) associated with the desired unit of data, using the same calculation that is used by the sender (as described above with reference to FIG. 4). Mapping of the 64-bit DID to a PID is done using a PID usage map and a modulus (PID index). The settop uses the PID usage map acquired when it first tunes to the inband channel. The PID usage map provides the settop with a starting PID number (which is the first PID in the PID usage map), followed by a Run-Length-Encoded (RLE) bitmap whose "on" bits indicate a PID in use. The modulus is performed on the number of "on" bits in the map. Once the PID index is determined, a number of on-bits in the PID allocation map are counted, and the PID offset corresponds to the number of counted PIDs. Then the PID number is computed by adding the start PID to the actual PID offset of the "on" bit within the map.

At step 504, the receiver checks the PID usage map to determine whether the calculated PID is being used. At step 506, if the calculated PID is not being used, the receiver immediately knows that the desired unit of data is not available, and at step 508, a file-not-found condition is detected.

If the PID usage map indicates that the PID calculated in step 502 is being used, then execution continues, but a final determination has not yet been made by the receiver whether the desired unit of data is available (because more than one file is transmitted using the same PID).

At step 510, the receiver waits to receive either the desired unit of data or a marker, whichever arrives first.

At step 512, if the standard marker is received, then at step 514, the receiver determines whether the received marker includes the calculated 64-bit DID (from step 502) for the desired unit of data. That is, the 32 MSBs of each 64-bit DID in the marker is compared to the 32 bits of the PIF. If no 64-bit DID containing MSBs matching the PIF is included in the standard marker, then at step 516, a file-not-found condition is detected.

If the standard marker does contain a 64-bit DID (from step 502) having a portion that matches the PIF, then step 518 is executed.

At step 518, the receiver waits until a unit of data with the standard multicast address (from step 502) is received. If a packet is received that has a different multicast address from that of the desired packet, the received packet is discarded, without checking the 32-bit PIF of the packet. In some embodiments, the 32 bit PIF is interrogated by hardware. In other embodiments, the PIF is interrogated by software program functions executed in a processor. When a unit of data having the desired standard multicast address is received, then at step 520, the 32-bit PIF transmitted with the received unit of data is compared to the 32 MSBs of the 64-bit DID calculated in step 502. If the received PIF matches the calculated 32-bits, then at step 522, the desired unit of data is "found."

If, however, the PIF contained in the received unit of data does not match the 32 MSBs of the calculated 64-bit DID in the standard marker, then a multicast collision is detected, and steps 524-530 are performed.

At step 524, the receiver waits to receive the alternate marker (or if the alternate marker has already been received, then the receiver examines the alternate marker).

At step 525, the alternate marker is checked, to determine whether the DID corresponding to the desired unit of data is listed in the alternate marker, If that DID is not listed in the alternate marker, then at step 526, a file-not-found condition is detected.

If the DID corresponding to the desired unit of data is listed in the alternate marker, then at step 527, the receiver reads the non-colliding multicast ID from the alternate marker.

At step 528, the receiver waits for the unit of data with the non-colliding multicast ID.

At step 530, when the packet having the non-colliding multicast ID is received, then the desired unit of data is found.

Variations of the method of FIG. 5 are contemplated. For example, in some embodiments, instead of using the 32-bit PIF to make the final comparison, the full 64-bit DID calculated by the server is included in each packet, and the receiver compares the full 64-bit DID of the received packet to the number contained in the marker. This provides an additional 16 bits that are independent of the multicast ID (as well as 16 bits that overlap with those used to form the multicast ID), for a total of 64 bits of entropy. The process flow is similar to that described above, except that at steps 514 and 520, the comparison is made to the 64-bit DID, instead of using the 32-bit PIF. In other embodiments, the PIF is composed of a different portion of the 64-bit DID than described above. In one example, the multicast address is formed by XORing segments A and C of the 64-bit DID, and the PIF is formed by concatenating segments B and D.

Overhead associated with the exemplary system described above is estimated as follows: Each file piece will increase by 10 bytes (6 additional bytes for the ID and 4 for the file length). A directory marker consuming one MPEG packet (188 bytes) every 10 seconds on every PID results in 700 packets per second in a 7000 PID map (Maximum packet rate is 17952/second). One DC2 packet will suffice for the PID map, which is cached. An event consumes 10 bytes in raw data; so about 16 events comprise a single MPEG packet. This works out to 5-6% of the bandwidth consumed by an exemplary file manager 206.

Given a file name, the exemplary "inband directory" system is able to provide fast lookups for existing files, as well as reasonably fast detection of nonexistent files. It provides timely notification of changes to files (version changes) in a way that is easily monitored by the set top 250. Synchronization between the directory (standard and alternate markers) and the files it represents is implicit. Minimal inband and settop resources are consumed. Inband bandwidth consumption is low, and settop CPU loading and memory usage is kept to a minimum. Lookup latency is optimized for speed, and the latency associated with lookup failure (files not found) is reasonably short. Large numbers of files are supported. Although 10,000 to 30,000 is considered nominal, the system is used to spin a larger number of files.

FIG. 6 is a diagram of data being transmitted via several PIDs. PIDs bearing no data carry no markers. Instead, a "PID usage" bitmap is sent on a separate PID 600 (referred to as the "golden PID") having a predetermined PID number. Once the receiver 250 determines the PID of the desired file, the receiver 250 checks the PID usage bitmap to determine whether that PID is currently in use. If the PID derivation calculation lands on an unused PID (bit is "off"), then a FNF is returned.

Although the exemplary embodiment places the standard and alternate markers on the individual PIDS 100, 200, 300 (reference numerals 602, 604 and 606, respectively) that carry payload data, other embodiments are contemplated in which an additional inband PID is allocated for sending and receiving the markers.

Although the exemplary embodiments use DC2 and MPEG formatted packets, in other embodiments, calculated directory type information is used with other packet formats. Although MPEG Program IDs are discussed above, in other embodiments including non-MPEG systems, calculated sub-channel assignments are used.

In the examples described above, the bit sequence used for the DID calculation is a file name. Bit sequences include, but are not limited to, alphanumeric strings. The DID serves as the basis for determining the PID, PIF and multicast address. In other embodiments, other unique strings and bit sequences besides file names are used. Also, in some embodiments, a bit sequence is used that is unique to a class of recipients. In other embodiments, a bit sequence is used that is unique to a class of files/packets. In other embodiments, other alternative keys uniquely associated with data and known to both the server and the receiver are used by the sender and receiver to generate the DID.

In other embodiments, the multicast identifier is not used. A field is added to a directory marker indicating the actual PID on which the unit of data is sent. In the event that two or more units of data have bit sequences that yield the same PID, the sender selects a non-conflicting PID, if an unused PID is available. The server minimizes the number of PIDs carrying multiple units of data. When a unit of data is assigned to a non-conflicting PID that is different from the PID determined by the calculation described above, the non-conflicting PID is listed in the directory marker.

The directory marker is sent in band. The 64-bit DID is calculated by sender and receiver, the PID is calculated by the sender as described above, and the PIF is calculated and included in the packet. For example, in some embodiments, the PIF is the 32 MSBs of the DID. The directory marker includes the DID and PID. If the receiver receives a unit of data having the PIF calculated by the receiver for the desired unit of data, then the receiver recognizes the received unit of data as being the desired unit of data. If the receiver listens for the calculated PID and receives a unit of data that does not have the desired PIF, the receiver waits for and examines the directory marker. When the receiver receives the directory marker, the receiver looks for the PIF of the desired unit of data. If the desired PIF is not listed, a file-not-found condition is detected. If the desired PIF is found, the receiver listens to the "alternate PID" associated with the desired unit of data, as indicated in the directory marker, until the desired unit of data is received.

Many variations are contemplated. For example, in some embodiments the head end system cyclically broadcasts on at least one digital broadband channel a software control signal corresponding to at least one video information provider. In some embodiments, the software control signal includes data for identifying audio/video program information of the at least one video information provider to a digital entertainment terminal receiving the digital broadband channels and executable code for controlling the digital entertainment terminal.

The exemplary embodiments of present invention are embodied in the form of computer-implemented processes and apparatus for practicing those processes. Other embodiments are in the form of computer program code embodied in tangible media, such as random access memory (RAM), floppy diskettes, read only memories (ROMs), CD-ROMs, DVD-ROMs, hard drives, high density (e.g., "ZIP™" or "JAZZ™") removable disks, or any other computer-readable storage medium, wherein, when the computer program code is loaded into and executed by a computer, the computer becomes an apparatus for practicing the invention. Other embodiments are in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although some embodiments use software to perform the functions described above, other embodiments include application specific integrated circuits to perform these functions.

Although the invention has been described in terms of exemplary embodiments, it is not limited thereto. Rather, the appended claims should be construed broadly, to include other variants and embodiments of the invention, which are recognized by those skilled in the art without departing from the scope and range of equivalents of the invention.

What is claimed is:

1. A method for transporting files from a cable headend, comprising:
   providing at the cable headend a plurality of files for transmission to a subscriber device, wherein each of the plurality of files includes a unique filename;
   providing different data identifiers (DIDs) determined from each of the unique filenames, respectively, using the DID determined from each unique filename to calculate a unique packet identifier (PID) and a multicast ID for each corresponding unique file name, wherein the PIDs and the multicast IDs distinguish the unique filenames from one another, and assigning file identifiers to each of the plurality of files where each of the file identifiers comprise of a PID, a DID and a multicast identifier;
   packetizing the plurality of files into packets, wherein each of the packets corresponding to one of the plurality of files is provided with the unique PID, the DID and the multicast identifier corresponding to the unique filename of the one of the plurality of files; and
   filtering a selected file from the plurality of files by selecting the packets having the unique PID, the DID and the multicast identifier corresponding to the unique filename associated with the selected file; and determining, for each of the files, a second identifier based on the DID of the file, wherein the second identifier is a PID formed by concatenating at least two portions of the DID.

2. The method of claim 1, wherein said communications channel transports an MPEG 2 bitstream.

3. The method of claim 1, wherein said communications channel transports Digicipher II data packets.

4. The method of claim 1, wherein said communications channel transports Service Information (SI) data packets.

5. The method of claim 1, wherein, for each of said files, the data identifier (DID) is generated with an approximately uniform probability distribution.

6. The method of claim 1 further comprising determining a payload identifier.

7. The method of claim 1, further comprising:
   detecting a collision condition in which two packets, associated with different files having different file identifiers associated therewith, have identical PIDs and identical multicast identifiers;
   determining a non-colliding multicast identifier for one of the two packets;
   transmitting information associating the file associated with the one of the two packets with the non-colliding multicast identifier; and
   transmitting one or more packets, of the file associated with the one of the two packets, using the non-colliding multicast identifier.

8. The method of claim 7, wherein the non-colliding multicast identifier is formed by adding a constant to the multicast identifier for which the collision condition is detected.

9. The method of claim 1, wherein each file identifier is a filename or a binary number.

10. The method of claim 1, wherein, for each of the files, said generating step comprises:
    calculating the DID based on one of the group consisting of a cyclic redundancy code, a hash function and a pseudorandom number formed from each file identifier.

11. The method of claim 10, wherein, for each of said files, the associated PID is determined by:
    (i) determining a PID index by equation:
        PID index=X modulo NPIDSON, where the PID index is an index into a table, X is a result of performing at least one XOR operation on two or more portions of the DID, and NPIDSON is a predetermined number;
    (ii) performing a table lookup using the PID index as a lookup parameter; and
    (iii) adding an offset to a value output by the table lookup to determine the PID.

12. The method of claim 10, further comprising transmitting a PID usage bitmap that identifies which PIDs are being used to transmit payload data.

13. The method of claim 1, wherein each of the files is transported using one of the group consisting of Moving Picture Experts Group (MPEG) 1 packets and MPEG 2 packets.

14. The method of claim 1 further comprising determining, for each file, the multicast identifier by selecting a first portion of the DID; and
    for each of the files, determining a second identifier based on the DID of the file, wherein the second identifier is a PID determined by selecting a second portion of the DID.

15. In a system including at least one file storage medium including at least one file to be transported from a sender to a receiver, wherein each of said at least one file to be transported has associated therewith a file identifier, the receiver comprising:
    at least one tunable filter;

a transform;
a packet processor; and
a processor programmed to utilize said at least one file to be transported;
said processor, for each of said at least one file, providing said file identifier of said file to said transform;
said transform, for each of said at least one file, providing at a cable headend a plurality of files for transmission to a subscriber device, wherein each of the plurality of files includes a unique filename and said transform before transmitting the plurality of files to the subscriber providing different data identifiers (DIDs) determined from each of the unique filenames, respectively, using the DID determined from each unique filename to calculate a unique packet identifier (PID) and a multicast ID for each corresponding unique file name, and assigning file identifiers to each of the plurality of files where each of the file identifiers comprise of a PID, a DID and a multicast identifier, wherein the DID and the multicast identifier are utilized to further distinguish the unique filename from another filename that is assigned the unique packet identifier, said packet processor packetizing the plurality of files into packets, wherein each of the packets corresponding to one of the plurality of files is provided with the unique PID, the DID and the multicast identifier, and said at least one tunable filter filtering a selected file from the plurality of files by selecting the packets having the unique PID, the DID and the multicast identifier corresponding to the unique filename associated with the selected file; and determining, for each of the files, a second identifier based on the DID of the file, wherein the second identifier is a PID formed by concatenating at least two portions of the DID.

16. The system of claim 15, wherein said transform further comprising:
detect a collision condition in which two packets, associated with different files having different file identifiers associated therewith, have identical PIDs and identical multicast identifiers, determine a non-colliding multicast identifier for one of the two packets, transmit information associating the file associated with the one of the two packets with the non-colliding multicast identifier, and transmit one or more packets, of the file associated with the one of the two packets, using the non-colliding multicast identifier.

17. A method for transporting files from a cable headend, comprising:
providing at the cable headend a plurality of files for transmission to a subscriber device, wherein each of the plurality of files includes a unique filename;
before transmitting the plurality of files to the subscriber, providing different data identifiers (DIDs) determined from each of the unique filenames, respectively, using the DID determined from each unique filename to calculate a unique packet identifier (PID) and a multicast ID for each corresponding unique file name, wherein the PIDs and the multicast IDs distinguish the unique filenames from one another, and assigning file identifiers to each of the plurality of files where each of the file identifiers comprise of a PID, a DID and a multicast identifier;
packetizing the plurality of files into packets, wherein each of the packets corresponding to one of the plurality of files is provided with the unique packet identifier, the data identifier (DID) and the multicast identifier that includes one of the numbers generated based on the unique filename of the one of the plurality of files;
filtering a selected file from the plurality of files by selecting the packets having the unique PID, the DID and the multicast identifier to the unique filename associated with the selected file; and
determining, for each of the files, a second identifier based on the DID of the file, wherein the second identifier is a PID formed by concatenating at least two portions of the DID.

* * * * *